Patented June 17, 1941

2,246,341

UNITED STATES PATENT OFFICE 2,246,341

PROCESS FOR THE PREPARATION OF PROGESTERONE

Hermann Bretschneider and András Salamon, Budapest, Hungary, assignors to the firm Chinoin Gyogyszer És Vegyészeti Termékek Gyára R. T. (Dr. Kereszty & Dr. Wolf), Ujpest, Hungary, a corporation of Hungary No Drawing. Application June 6, 1939, Serial No. 277,744. In Hungary June 11, 1938

18 Claims. (Cl. 260—397.3)

This invention relates to a novel process of preparing progesterone by the oxidation of sterol or sterol derivatives. More particularly, the invention relates to a process for producing progesterone by oxidizing cholestenone in sulphuric acid solutions stronger than 50%.

It is among the objects of this invention to provide a novel process of preparing progesterone by oxidizing cholestenone which will give much better yields than similar processes known heretofore.

The preparation of progesterone by oxidation of sterols or sterol-derivatives has been already described by several authors. One of these methods (Dirschel, Hannusch, Darstellung von Progesteron, Hoppe-Seilers Ztschr. Bd. 252,49) consists in oxidizing cholestenone in glacial acetic acid with chromic acid and isolating androstendione and progesterone from the oxidation products. By this method, however, the yield of progesterone is, also in comparison with the androstendione simultaneously formed, very small.

We have found, that progesterone can be produced in much better yields by oxidizing cholestenone in sulphuric acid solutions stronger than 50 per cent. So e. g. sulphuric acid of 60 per cent. can be used but employing more concentrated sulphuric acid, say of 80 per cent., the yields are even higher. With a such concentrated sulphuric acid cholestenone forms a derivative the isolation of which could not be effected as yet. Cholestenone forms a compound with chromic acid as well as is demonstrated by shaking a benzine or carbontetrachloride solution of cholestenone together with a mixture of dry sodium sulphate and chromic acid anhydride, when a cholestenone-chromic acid compound is formed; this being soluble in the organic solvent and, if the solvent is evaporated, is obtainable as an amorphous solid the crystallization of which being rather difficult. This cholestenone-chromic acid compound can also be oxidized in an 80 per cent sulphuric acid.

As oxidizing agent chromic acid, dissolved in concentrated sulphuric acid, but chromates, chromic anhydride are equally suitable for this purpose.

The oxidation is, preferably, carried out below room-temperature, the best between —5 and +5° C.

The reaction mixture is worked up by dilution with much water and extraction with water-immiscible solvents, as e. g. benzene. The benzene extract is shaken with alkali in order to remove oxidation products of acidic properties; the progesterone can be separated from the solution, containing now only neutral products, by different ways.

For instance, if the benzine solution of the oxidation mixture, after it has been freed from acid components by extraction with alkali, is subjected to distribution with 90 per cent. aqueous methyl alcohol, the bulk of unchanged cholestenone remains in the benzine layer while progesterone passes into the aqueous methyl alcohol (Solution A). From the residue of the benzine solutions the cholestenone is recovered by crystallization from methyl alcohol or acetone. The mother-liquors of the latter are evaporated, the residue re-dissolved in benzine and re-extracted with 90 per cent. methyl alcohol. The methyl alcoholic solution thus obtained contains some progesterone and is united with Solution A aforementioned, which is now evaporated and the residue redissolved in benzine and extracted repeatedly with aqueous methyl alcohol the water content of the methyl alcohol being gradually increased to 30 per cent. —thus collecting progesterone in the methyl alcoholic solution. The amount of progesterone remaining in the benzine solution becomes quite negligible. The 70 per cent. methyl alcohol solution is then diluted with water to an alcohol content of 20 per cent. and extracted repeatedly with benzine, saturating the aqueous layer with sodium chloride. By this a further purification is effected as progesterone passes into the benzine layer practically without loss, while benzine-insoluble and methanol-insoluble resinous impurities separate.

Another variation of the purification process is represented by chromatographic selection. A benzene solution of the oxidation products, which have been grossly freed form unchanged cholestenone in any way e. g. as described before, is sent through a column of Brockmann's aluminium oxide. Progesterone remains unadsorbed in the benzene solution; the residue of this solution is then re-dissolved in benzine and subjected to distribution with gradually diluted methyl alcohol as described above. The chromatographic selection can be carried out also before the purification by distribution.

The concentration of progesterone in the oxidation products can take also the following course: The benzene solution, after it has been freed from acid components, is evaporated and the residue crystallized from acetone or methyl alcohol in order to remove unchanged cholestenone. The mother-liquors, containing the progesterone, are evaporated, the residue redissolved in benzene and the progesterone taken into an aqueous solution by extraction with concentrated hydrochloric acid. The separated hydrochloric layer is then diluted with much water and progesterone is extracted by benzene.

Further purification from ballasts can be effected by repeating the described operations as chromatographic selection, distribution between solvents etc. In this way highly concentrated progesterone is obtained finally, suitable for therapeutic preparations or for isolation of progesterone in crytalline state.

In course of the afore-mentioned methods of concentration there is wide range of varying the individual operations as to their subsequence or repetition.

In order to isolate crystalline progesterone, products enriched in the above mentioned ways can be used. They are dissolved in a mixture of benzine-benzene (e. g. 3:1) and subjected in this solution to a chromatographic selection on Brockmann's aluminium oxide. The chromatogram is first developed by the same mixture, later the benzene ratio is raised and finally pure benzene is used. The solutions, passing the column, are taken up in fractions. The richest in progesterone are the middle-fractions, mainly those which are obtained by benzine-benzene of the ratio 1:1. The single fractions are evaporated separately and the residues are crystallized from a mixture of ether-petrolether. Occasionally, the first fractions contain a substance of M. P. 126–127°, which is not progesterone though. From further fractions we are obtaining progesterone, M. P. 126–127°, which has after recrystallization M. P. 127–129° and $[\alpha]_D$ 196°. The non-crystallizing fractions and the mother-liquors of crystalline progesterone can be used to yield further quantities of progesterone by further chromatographic purification and/or by distillation in high vacuum and/or by separating progesterone by means of keton-reagents, suitably with semicarbazide. The semicarbazone can be split with pyruvic acid and in this way crystalline progesterone is obtained, which might be further purified by re-crystallization. As a matter of understanding, the repeated chromatographic purification and the isolation with semicarbazide can be carried out not only separately but also by combining the methods and/or vary or repeat them in their subsequence at will.

*Examples*

1. Fifty grms. of cholestenone are dissolved in 50 grms. of glacial acetic acid by heating and then introduced, after proper cooling, into a sulphuric acid solution made out of 350 ccm. of sulphuric acid of the specific gravity of 1.84 and 150 ccm. of water. The resulting solution is of reddish colour with a green fluorescence (Solution 1). The use of glacial acetic acid serves merely to accelerate the solving process. This small amount of glacial acetic acid can, however, be dispensed with.

85 grms. of chromic anhydride are dissolved in 850 ccm. of water and mixed with 1986 ccm. of sulphuric acid of the specific gravity of 1.84, care being taken that the temperature should not rise above 90°, whereas an energetic cooling is also to be avoided, lest chromic acid should re-crystallize (Solution 2).

Solution 1 is placed into a flask mounted with a proper stirrer and cooled to −5°. Solution 2 is now allowed to run into Solution 1 while stirring and cooling externally, the temperature of the mixture being kept at about −2°. The adding of Solution 2 takes about 4–5 hours, after which the mixture is poured on about 3 kgrms. of cracked ice. The resulting fluid is extracted exhaustively with benzene and the united benzene solutions are re-extracted with a diluted (about 10 per cent.) sodium hydroxide solution in order to remove acidic components. The benzene solution is now washed with water until neutral reaction, dried with anhydrous sodium sulphate and evaporated in vacuum. The residue, weighing about 14.5 grms., is taken up in acetone. On cooling, unchanged cholestenone separates. The crystals are filtered and washed with some cold acetone and subsequently with methyl alcohol. The progesterone is to be found in the filtrate. This is evaporated in vacuum and the residue is redissolved in a mixture of 150 ccm. of benzene-benzine 1:1. The resulting solution is extracted 5 times with cold (about +5°) concentrated hydrochloric acid using 100 ccm. of the latter on each occasion. The benzene-benzine layer contains some cholestenone which can be recovered. Progesterone is now in the united hydrochloric acid extracts. These are diluted with 1500 ccm. of water and extracted with benzene or ether. Progesterone passes over into the benzene respectively the ethereal solution, which is washed until neutral reaction and then dried with anhydrous sodium sulphate. The benzene solution can be decolourized with 10 grms. of Brockmann's aluminium oxide. It is then evaporated, leaving a yellow oily residue of about 2 grms. This residue is dissolved in a mixture of benzene-petrolether (e. g. 1 part of benzene and 2 parts of petrolether) and made pass a column consisting of 30 grms. of Brockmann's aluminium oxide, the chromatogram being developed by a benzene-petrolether mixture of the same ratio as above. The solution dropping through the column is taken up in rates of about 10 ccm., the single rates being evaporated separately. The residues are re-dissolved in ether and made to crystallize by addition of petrolether. The mother-liquors of these crystallizations yield further quantities of crystals. The last mother-liquors are evaporated and distilled in vacuum at a pressure of 0.001 mm. The fraction obtained at about 180°, can be crystallized from ether-petrolether, yielding some more progesterone. The total yield is about 0.1 grm. M. P. 126.5°.

The latter fractions of the chromatographical selection together with the last mother-liquors of the crystallizations, are difficult to induce to crystallization, though they still contain remarkable quantities of progesterone and are exhibiting strong corpus luteum action in the animal test.

The oxidation can be carried out also in that way that a carbon-tetrachloride solution of the cholestenone-chromic acid compound is used by introducing this solution into cooled 70–80 per cent. sulphuric acid, into which at the same time a solution of chromic acid in 70–80 per cent. sulphuric acid is running. The reaction and the further operations are similar to those described above.

2. In discordance with Example 1 the operations can take also the following course: Cholestenone is dissolved in 1 part of glacial acetic acid and the resulting solution is introduced into a mixture of 15 parts of sulphuric acid of 92–95 per cent and 4.2 parts of water, at a temperature of 5°. To this a solution of 2 parts of chromic acid (chromium trioxide) in 80 parts of sulphuric acid and 12.5 parts of water is added gradually. Oxidation is carried out while stirring and cooling similarly to the description given in Example 1. The oxidation mixture is poured on cracked ice and extracted with benzene, the benzene extract being washed first with sodium hydroxide and afterwards with water until the reaction becomes neutral. Starting from 1 kgrm. of cholestenone, this benzene solution yields about 220 grms. of a residue, which is taken up in subsequence in a mixture of 1100 ccm. of petrolether and 220 ccm. of methyl alcohol. On addition of 24 ccm. of water, two layers are formed. The petrolether layer is extracted 4 times with aqueous methyl alcohol using 220 ccm. of methyl alcohol and 24 ccm. of water on each occasion. Unchanged cholestenone remains in the benzine layer. The five 90 per cent. methyl alcoholic solutions are united and evaporated to half of their volumes thus bringing some more cholestenone to precipitation. This is filtered off and washed with some acetone or methyl alcohol. The mother-liquors yield on evaporation about 70 grms. of a residue. This is taken up in a mixture of 700 ccm. of benzine (B. P. 60–70°) and 700 ccm. of methyl alcohol and then small portions of altogether 78 ccm. of water are added. Addition by small portions is to be observed strictly lest undesired emulsions may develop. After shaking thoroughly, the benzine solution (Solution $B_1$) is separated, while the methyl alcoholic layer is shaken anew with 700 ccm. of benzine. This time 97 ccm. of water are added in small portions. The benzine layer is again separated (Solution $B_2$). The methyl alcoholic layer is shaken for the third time with 700 ccm. of benzine, under addition of 125 ccm. of water. The benzine layer (Solution $B_3$) and the methyl alcoholic layer (Solution $M_1$) are separated. Now the benzine solution $B_1$ is mixed with 700 ccm. of methyl alcohol and 78 ccm. of water are added to, again in small portions. The mixture is shaken thoroughly and from the resulting two layers the benzine layer (Solution $B_1'$) is separated. The methyl alcoholic layer is shaken with the benzine solution $B_2$, under addition of 97 ccm. of water as indicated above. The benzine layer $B_2'$ is resulting and after separation the methyl alcoholic solution is mixed and shaken with solution $B_3$, under addition of 125 ccm. of water. The benzine layer $B_3'$ and the methyl alcoholic layer $M_2$ are separated. Now, the benzine solution $B'$ is mixed with 700 ccm. of methyl alcohol, shaken, 78 ccm. of water added to and shaken again. The methyl alcoholic layer, obtained after separation, is mixed with solution $B_2'$ and, under shaking, 97 ccm. of water are added. After shaking and separating, the methyl alcoholic layer is mixed with Solution $B_3'$, shaken through and mixed with small portions of 125 ccm. of water. After separation, the methyl alcoholic layer is united with the methyl alcoholic solutions $M_1$ and $M_2$, obtained above. It may well happen, that in course of this method of partition, which is working on the counter-current principle, some emulsion will be formed or precipitation will occur. This is to be taken into account but it is not affecting the success of the operation. Resinous precipitates or emulsions can be removed by filtration if this seems to be necessary. Also systematic extractions other than the partition method described above can be employed.

The united methyl alcoholic solutions (of about 2800 ccm.), still containing colouring impurities, are mixed with 4 litres of benzine and to the benzine layer $B_4$ and into the aqueous litres of water, at last small portions of altogether 500 ccm. of water are added, under continual shaking. A brown resin is precipitating, sticking to the sides of the flask. The fluid is decanted from this precipitate and separated into the benzine layer $B_4$ and into the aqueous layer containing 20 per cent. methyl alcohol. This latter layer is now shaken thoroughly with 1 litre of benzine. The resulting two layers are separated into benzine layer $B_5$ and the methyl alcohol containing layer, which is mixed in subsequence with 3 litres of a saturated sodium chloride solution and shaken with 1 litre of benzine. After separation, the benzine layer is united with the benzine solutions $B_4$ and $B_5$, washed with water, dried with anhydrous sodium sulphate and evaporated to dryness. A residue of about 18 grms. is left behind, possessing a specific rotatory power of about $+86°$ in chloroform.

In order to effect further purification, this amorphous residue is dissolved in a mixture of petrolether and benzine of the ratio 3:1 and is chromatographed in a tube filled with about 360 grms. of Brockmann's aluminium oxide. The chromatogram is developed by a petrolether-benzene mixture of the same ratio as above. The first nine fractions (of about 50 ccm. each) contain 2.3 grms. of dry residue that are crystallizing readily on addition of ether. These crystals are melting at 126–127°, sublimating readily in high vacuum, but are ineffective in Clauberg's animal test. In the following 10th and 11th fraction of the volumina 100 and 600 ccm. respectively the quantity of the dry residue falls rapidly. At this, the column is washed out with a petrolether-benzene mixture of the ratio 1:1, during which four fractions (12th–15th) are obtained of the 100, 150, 200 and 400 ccm. respectively. The fractions 10th–15th are united, leaving on evaporation 3.5–4 grms. of dry residue which is crystallizing from a mixture of ether-petrolether. The crystalline progesterone (1.7–2 grms.) melts at 125–127° and has, after repeated recrystallization from ether-petrolether, M. P. 127–129° and $[\alpha]_D +197°$ in chloroform. From mother-liquors of the crystalline preparations, as also from the chromatographic fractions obtained before and after the main-fractions, further quantities of progesterone can be obtained by repeating the operations described above.

What we claim is:

1. A process for the preparation of progesterone by oxidizing cholestenone in sulphuric acid stronger than of 50 per cent and isolating progesterone from the resulting reaction-mixture.

2. A process according to claim 1, in which sulphuric acid stronger than 75% and weaker than 83% is used.

3. In the process for the preparation of progesterone by oxidizing cholestenone in sulfuric acid stronger than 50%, the step of distilling the non-crystallizing fractions and the residue of the mother-liquors of crystalline progesterone in high vacuum followed by preparing functional derivatives of progesterone by using ketone-reagents and by purifying the functional derivatives by fractional crystallization, and regenerating progesterone by splitting these derivatives.

4. A process for preparing progesterone which comprises effecting the oxidation of cholestenone in a sulfuric acid medium, the sulfuric acid being stronger than 50%.

5. A process for preparing progesterone which comprises effecting the oxidation of cholestenone in a sulfuric acid of more than 78 and less than 82%.

6. A process for preparing progesterone which comprises effecting the oxidation of cholestenone in a sulfuric acid of more than 60 and less than 85%, the oxidizing agent being a member of the group consisting of: chromic acid, chromic anhydride, and chromates.

7. A process for preparing progesterone which comprises effecting the oxidation of cholestenone in sulfuric acid as medium, the sulfuric acid being at least of 60% and at most of 85%, the oxidizing agent being a member of the group consisting of: chromic acid, chromic anhydride, and chromates, the temperature being kept during the oxidation below $+5°$ C.

8. In the process of separating progesterone from the neutral parts of the oxidation products obtained by oxidizing cholestenone in a sulfuric acid of more than 50%, the steps which comprise effecting a distribution of said neutral parts between two solvents immiscible with one another, one of these solvents being a member of the group consisting of: petrol ether, ligroin, benzine, and aliphatic hydrocarbons, the other of these solvents being an aqueous aliphatic alcohol containing not more than 30% of water, and which steps comprise further isolating progesterone from the aqueous alcoholic layer obtained after the distribution.

9. A process as claimed in claim 8 which comprises effecting the distribution between petrol ether and an aqueous methanol containing not more than 30% and not less than 10% of water, separating the methanolic layer, diluting this layer with water to the water content of more than 70 and less than 90% and extracting from this aqueous layer the progesterone with a solvent of the group consisting of: petrol ether, ligroin, benzine, and aliphatic hydrocarbon.

10. In the process of separating progesterone from the neutral parts of the oxidation products obtained by oxidizing cholestenone in a sulphuric acid of more than 50%, the steps which comprise subjecting said neutral parts to a chromatographic selection, the solvent being benzol, the adsorbent being aluminium oxide, the progesterone being separated from the benzole solution which has passed the aluminium oxide chromatogram column.

11. A process as claimed in claim 10 which comprises subjecting the remainder of the benzene solution which has passed the aluminium oxide column to a further chromatographic selection, the remainder being dissolved in a mixture of benzol-benzine, the adsorbent being aluminium oxide, the chromatogram being developed by mixtures of benzol-benzine, the benzol content of these mixtures being increased to a benzol content of 100%, the solutions dropping from the column being collected in fractions and the progesterone being obtained by recrystallization of the middle fractions.

12. In a process of separating progesterone from the neutral parts of the oxidation products obtained by oxidizing cholestenone in a sulfuric acid of more than 50%, the steps which comprise preparing by means of a ketone reagent a functional derivative of the progesterone, isolating this functional derivative by means of crystallization and regenerating the progesterone from this functional derivative and recrystallizing the progesterone.

13. A process as claimed in claim 1, wherein the oxidation is effected by at least one member of the group consisting of chromic acid, chromic anhydride and chromates.

14. A process according to claim 1, in which the oxidation is effected below room temperature.

15. A process according to claim 1, in which the oxidation product is freed from components of acidic character, followed by the removal of unchanged cholestenone by partition between benzine and methyl alcohol of 90 per cent, the progesterone being separated from the methyl alcoholic layer.

16. In the process for the preparation of progesterone by oxidizing cholestenone in sulphuric acid stronger than 50%, and extracting the oxidation product with benzene, the steps of distributing the residue of the benzene extraction between aqueous methyl alcohol, containing between 10% to 30% water, and petrol ether, and collecting the progesterone in a petrol ether solution by extracting the separated aqueous methyl alcoholic layer with petrol ether.

17. A process according to claim 16, in which the aqueous methyl alcoholic solution obtained in the distribution operations is extracted with petrol ether, the residue of this petrol ether extraction is dissolved in benzene and subjected to chromatographic selection on aluminum oxide, and the progesterone separated from the benzene solution which has passed the aluminum oxide column.

18. In the process for the preparation of progesterone by oxidizing cholestenone in sulphuric acid stronger than 50%, the steps of distributing the neutral portions of the oxydation product between aqueous methyl alcohol, containing 10–30% water, and between petrolether, and extraction of the aqueous methyl alcoholic layer with petrolether and subjecting the residue of this petrolether extraction, in benzene solution, to chromatographic selection on aluminium oxide and subjecting the residue of the benzene solution which has passed the aluminium oxide column, again to a chromatographic selection on aluminium oxide, using now a benzene-benzine mixture as solvent, the chromatogram being developed by a benzene-benzine mixture.

HERMANN BRETSCHNEIDER.
ANDRÁS SALAMON.